United States Patent
He et al.

(10) Patent No.: US 6,650,809 B2
(45) Date of Patent: Nov. 18, 2003

(54) MULTIPLE BAND OPTICAL MULTIPLEXER AND DEMULTIPLEXER

(75) Inventors: Jian-Jun He, Ottawa (CA); Orazlo Berolo, Ottawa (CA); Michael Davis, Ottawa (CA)

(73) Assignee: Metrophotonics Inc., Ottawa (CA); .

( * ) Notice: Subject to any disclaimer, the term of this patent is extended or adjusted under 35 U.S.C. 154(b) by 316 days.

(21) Appl. No.: 09/809,162

(22) Filed: Mar. 16, 2001

(65) Prior Publication Data

US 2002/0131685 A1 Sep. 19, 2002

Related U.S. Application Data

(60) Provisional application No. 60/266,465, filed on Feb. 6, 2001.

(51) Int. Cl.[7] .............................. G02B 6/28; G02B 6/34; H04J 14/00
(52) U.S. Cl. ................... 385/24; 385/37; 398/43
(58) Field of Search ............................. 385/24, 31, 37, 385/39, 46; 398/43, 45, 58, 66

(56) References Cited

U.S. PATENT DOCUMENTS 5,748,815 A * 5/1998 Hamel et al. ............... 385/37

* cited by examiner

Primary Examiner—Walter E. Snow
(74) Attorney, Agent, or Firm—Freedman & Associates

(57) ABSTRACT

A grating based optical wavelength demultiplexer that can be used for multiple wavelength bands over a wide wavelength range is presented. The spectral response of the device is cyclic. The free spectral range of the grating is designed to be large enough to contain all the wavelength channels to be demultiplexed within a band but small compared to the overall wavelength window of the network application so that a multiplexed signal within any one of the wavelength bands within the application window can be demultiplexed by the same device. This device, being bidirectional will also operate as a multiplexer. By using such a cyclic design, an organization will not need to stock different parts for each band and thus significantly reduce the inventory cost.

10 Claims, 6 Drawing Sheets

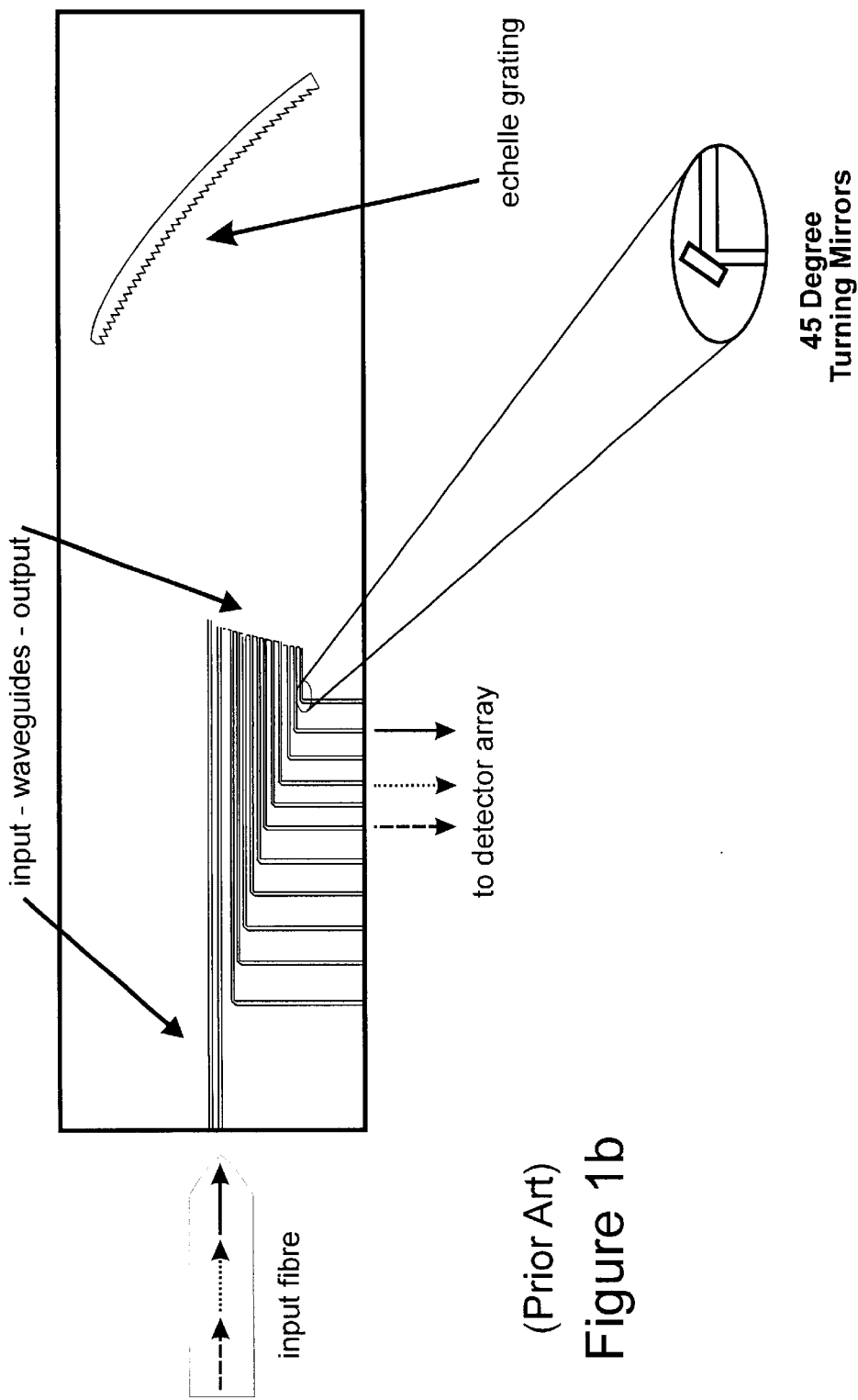
(Prior Art) Figure 1b
(Prior Art) Figure 1c

MULTIPLE BAND OPTICAL MULTIPLEXER AND DEMULTIPLEXER

This application claims the benefit of U.S. Provisional Patent Application No. 60/266,465 filed Feb. 6, 2001.

FIELD OF THE INVENTION

This invention relates generally to optical multiplexing/demultiplexing and more particularly to an optical device capable of processing different wavelength channels in multiple bands of a wavelength window.

BACKGROUND OF THE INVENTION

The rapid adoption of the Internet has resulted in a need to provide large amounts of bandwidth over long distances. To accomplish this optical networks have been deployed all over the world. The amount of information that a single fiber optic cable can carry is typically boosted using wavelength division multiplexing (WDM). This technique allows many different wavelengths of light to travel over the same fiber. Many different DWDM technologies have been developed, including integrated waveguide demultiplexers based on phased array waveguide gratings (AWG) and etched echelle grating-on-a-chip spectrometers. The integrated devices have many advantages such as compactness, reliability, reduced fabrication and packaging costs, and potential monolithic integration with active devices of different functionalities. The wavelength range of a WDM system is determined by the optical amplifiers used in the transmission line. Currently the most commonly used amplifiers are erbium-doped fiber amplifiers (EDFA). The wavelength windows are from 1530 nm to 1565 nm (C-band) and from 1570 nm to 1610 nm (L-band). Each of the wavelength windows can accommodate about 40 channels with 100 GHz (~0.8 nm) spacing, or 80 channels with 50 GHz (~0.4nm) spacing.

For many network applications, especially for metropolitan networks, it is desirable that the system be scalable, for instance a small number of channels are added/dropped at a node initially but that number may be increased at a later time together with the total number of channels in the system, as demand on the network increases. Such a scalable system requires many multiplexers and demultiplexers of a small channel count, such as 4, 8, and 16-channel devices. Each of the devices operates within a narrow wavelength band of several nanometers. A large number of different components with different operating wavelength bands are required to cover the whole wavelength window of the EDFA. For example, for a system designed with 4-channel 100 GHz spacing or 8-channel 50 GHz spacing as a unit, the operating wavelength band of each device is about 3.2 nm. At least ten different multiplexers and demultiplexers are required to cover each of the EDFA windows. Therefore, the system providers and component suppliers need to maintain a large inventory to stock each of the different parts. The cost for maintaining such a large inventory is very high.

It would be very beneficial to produce a multiplexer/demultiplexer component featuring the capability of operating over more than one band. Even if the device should end up being used on only a single band then a benefit still exists because the organizations that need to maintain inventories of these parts will be able to use the same part for any band instead of being forced to stock different parts for each band. It also simplifies the manufacturing and assembly processes for both system and component suppliers because the number of different components is reduced.

OBJECT OF THE INVENTION

It is an object of the invention to provide a waveguide grating based component capable of performing multiplexing or demultiplexing function in multiple wavelength bands.

SUMMARY OF THE INVENTION

In accordance with the invention there is provided an optical device for use in an optical network having a predetermined application wavelength window comprising:
  an input port for receiving a multiplexed optical signal including optical signals within each of a plurality of wavelength channels having a predetermined channel spacing within any one of a plurality of non-overlapping wavelength bands within said application wavelength window;
  a plurality of output ports;
  a wavelength dispersive element for separating the multiplexed optical signal received at the input port in dependence upon wavelength to provide a channelised signal to each of the output ports;
  wherein the device is for operation within any one and only one of a plurality of non-overlapping wavelength bands at a same time within said application wavelength window and wherein an optical signal corresponding to a first optical channel within any one of said plurality of non-overlapping wavelength bands is provided to a first output port, a second optical signal corresponding to a second optical channel within any one of said plurality of non-overlapping wavelength bands is provided to a second output port, and an n-th optical signal corresponding to an n-th optical channel within any one of said plurality of non-overlapping wavelength bands is provided to the n-th optical output port.

In accordance with another embodiment of the invention there is provided an optical network having a predetermined application wavelength window comprising:
  a plurality of optical band add-drop nodes each comprising
  a demultiplexing device supporting multiple wavelength bands within the application wavelength window including:
    an input port for receiving a multiplexed optical signal including optical signals within each of a plurality of wavelength channels having a predetermined channel spacing within an add-drop wavelength band corresponding to any one of a plurality of non-overlapping wavelength bands within the application wavelength window;
    at least three output ports; and
    a wavelength dispersive element for separating the multiplexed optical signal received at the input port in dependence upon wavelength to provide a channelised signal to each of the at least three output ports,
  a multiplexing device supporting multiple wavelength bands within the application wavelength window including:
    an output port for receiving a multiplexed optical signal including optical signals within each of a plurality of wavelength channels having a predetermined channel spacing within a same add-drop wavelength band corresponding to any one of a plurality of non-overlapping wavelength bands within the application wavelength window;

at least three input ports; and a wavelength dispersive element for combining the channelised optical signals received at the input ports in dependence upon wavelength to provide a multiplexed signal to the output port, a first optical band pass filter for separating optical channels within said add-drop wavelength band from those of other wavelength bands and for providing optical signals within the optical wavelength channels within the add-drop wavelength band to the input port of the demultiplexing device; and, a second optical band pass filter for receiving optical signals within other wavelength bands from the first optical band pass filter and for combining the same with the optical signals within optical wavelength channels within the add-drop wavelength band received from the output port of the multiplexing device, wherein the add-drop wavelength bands for a set of different nodes are different and wherein the multiplexing and demultiplexing devices for a same set of different nodes are identical, wherein at different nodes a signal within a different wavelength channel is directed toward a same output port of the identical devices.

In accordance with another aspect of the invention there is provided a method of demultiplexing channelised optical signals comprising the steps of providing an optical signal including signals in several of a plurality of non-overlapping wavelength bands within an application wavelength window;

filtering the optical signal to separate a second optical signal including optical signals within a first single non-overlapping wavelength band and separate a third optical signal including optical signals within a second non-overlapping wavelength band;

providing the second optical signal to a first optical demultiplexer;

demultiplexing the second optical signal into a plurality of channelised signals within the first non-overlapping wavelength band;

providing the third optical signal to a second optical demultiplexer identical to the first optical demultiplexer; and demultiplexing the third optical signal into a plurality of channelised signals within the second non-overlapping wavelength band.

In accordance with the invention there is also provided an optical device for use in an optical network supporting optical communication within an application wavelength window comprising:

a first port for receiving a multiplexed optical signal including optical signals within each of a plurality of wavelength channels having a predetermined channel spacing within any one of a plurality of non-overlapping wavelength bands;

a plurality of second ports; and a wavelength dispersive element for separating the multiplexed optical signal received at the first port in dependence upon wavelength to provide a channelised signal to each of the plurality of second ports, wherein the wavelength dispersive element has a periodic wavelength response having a free spectral range less than or equal to half of the application wavelength window such that a first optical device is for use within a system for at least one of multiplexing and demultiplexing channelised optical signals within a first non-overlapping band within the application wavelength window and a second identical optical device is for use within a system for at least one of multiplexing and demultiplexing channelised optical signals within a second different non-overlapping band within the application wavelength window.

BRIEF DESCRIPTION OF THE DRAWINGS

FIG. 1b is a prior art schematic diagram of a curved reflective diffraction grating (de)multiplexing device;

FIG. 1c is an enlarged schematic diagram of a prior art turning mirror integrated into the substrate of a diffraction grating;

DETAILED DESCRIPTION OF THE INVENTION

In order to overcome the limitations of the prior art in which the device is only useable over a single, relatively narrow band it has been proposed that a WDM device of a small channel count be made having a cyclic response within the application window.

Figure 1A:
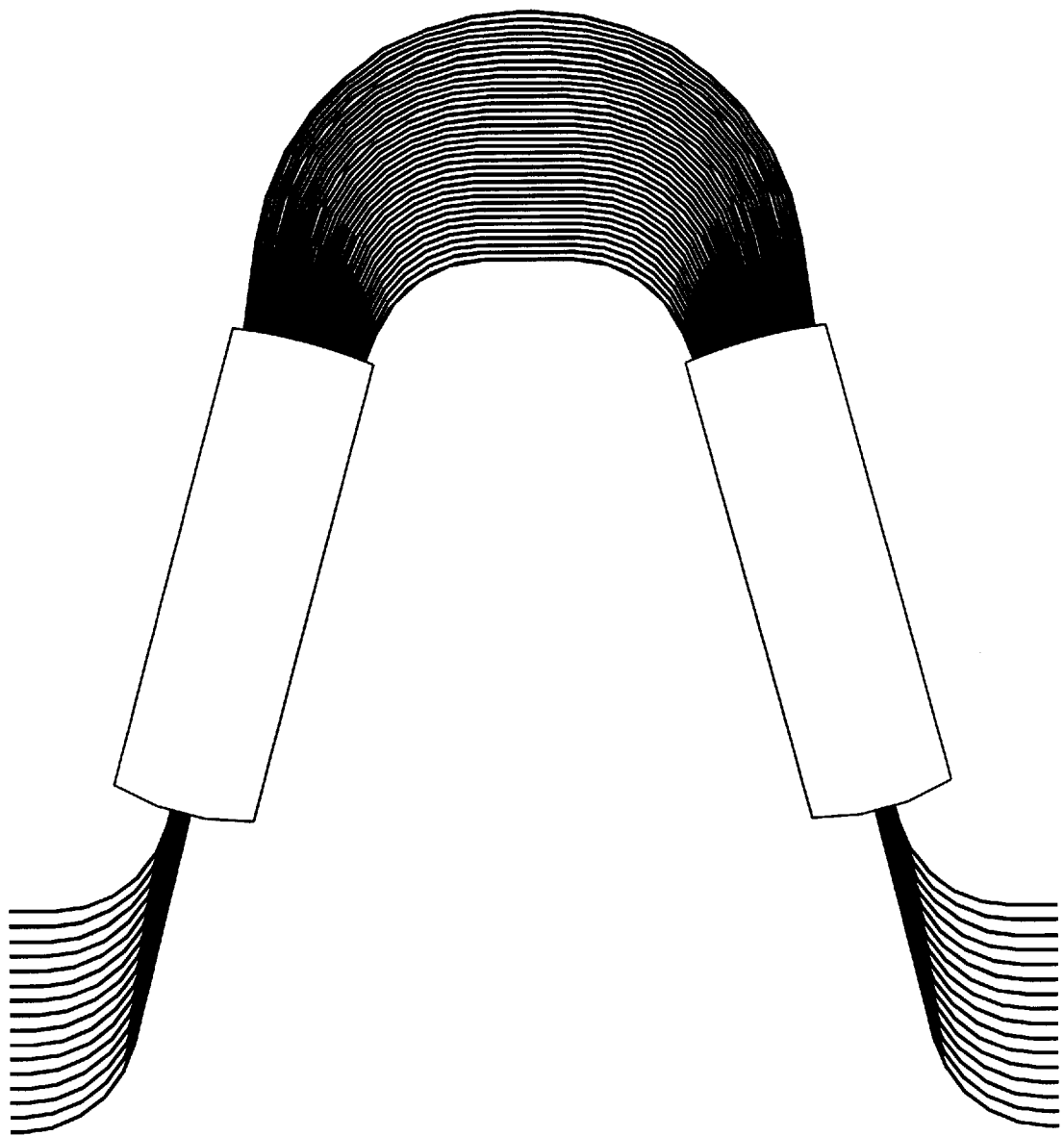
FIG. 1a is a prior art schematic diagram of an arrayed waveguide grating (AWG) device.

Referring to FIG. 1a, an arrayed waveguide grating device according to the prior art is shown. In FIG. 1b, an etched reflecting diffraction grating device according to the prior art is shown. When a prior art device performs a demultiplexing function, multiple signal channels of different wavelengths launched into an input waveguide are separated and each channel is directed to a predetermined one of the output waveguides. The principles of operation of the two types of devices are similar in that they both contain a dispersive and focusing component including an array of optical elements. Each of these elements introduces a slightly different optical path length for a beam traveling from an input to an output port. In an etched grating, this optical element is a reflecting mirror (grating facet) whereas in the case of an AWG, it is an optical waveguide.

The spectral response property of the device according to the present invention will be described in relation to an application wavelength window. In this patent disclosure, the application wavelength window, or sometimes referred simply as application window, is defined as the wavelength range encompassing all wavelength channels in the network that the device is used in, an example being one or both of the C- and L-band of an EDFA.

Figure 2:
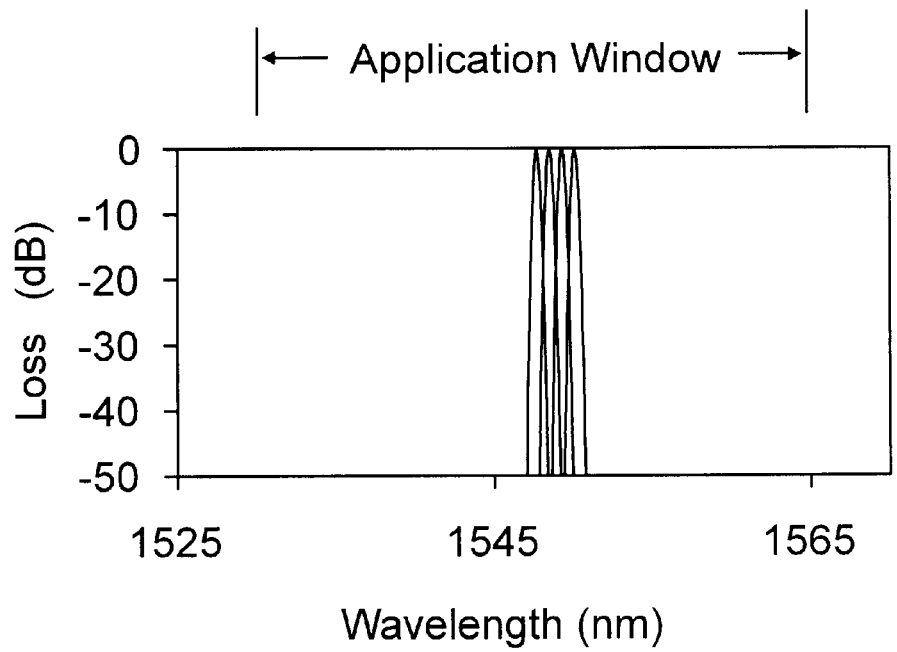
FIG. 2 is a typical overall spectral response curve of a WDM device which separates four wavelength channels within an EDFA application window according to prior art.

FIG. 2 shows graphically typical behavior of the device according to prior art, described by the spectral response, i.e., the transmission coefficient of each channel as a function of wavelength. In this example, the device separates four wavelength channels within an EDFA application window. Many devices with different channel wavelengths are required to cover the whole application window.

To overcome the above limitation, according to the invention the spectral response of the device for each channel is periodic within the application window. A grating with a high diffraction order is used so that the free spectral range of the grating is large enough to contain all the wavelength channels to be demultiplexed within a band but small compared to the overall wavelength window of the network application so that a multiplexed signal within any one of the many wavelength bands within the application window is demultiplexed by the same device.

Figure 3:
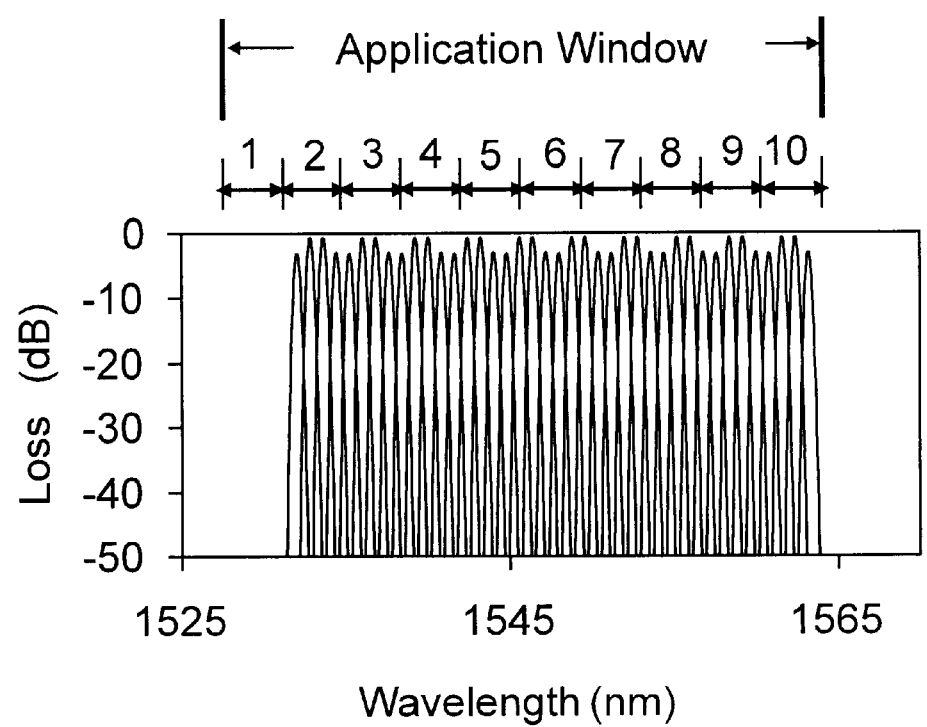
FIG. 3 is overall spectral response curves of a simple implementation of the invention supporting multiple bands within the application window.

FIG. 3 illustrates the overall spectral response curves of a simple implementation of the device supporting multiple bands within the application window according to a first embodiment of the invention. In this embodiment, the free spectral range of the device is substantially equal to the width of each band, which is equal to the channel spacing multiplied by the number of channels within a band. All channels within the application window are accessed using the same device.

Figure 4:
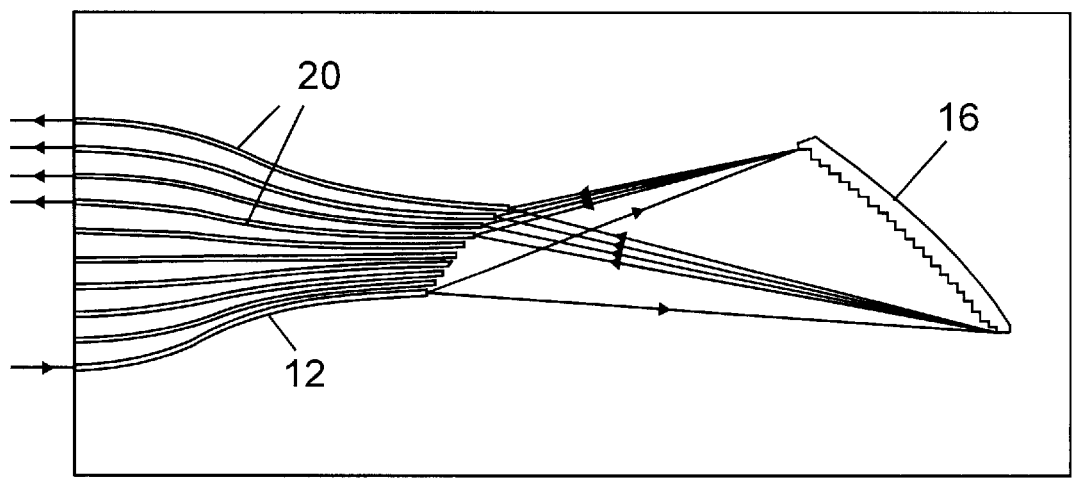
FIG. 4 is a schematic diagram of an implementation of the invention featuring a curved reflective diffraction grating.

Referring to FIG. 4, a device according to the invention is shown, using an echelle grating as an example. Light enters the device from the input waveguide 12. The light propagates in the planar waveguide and interacts with the echelle grating 16. The echelle grating reflects the light and causes separation of the light signals based upon their wavelength channels. The light signals of different channels within a wavelength band are captured by separate output waveguides 20 and leave the grating substrate from separate output ports. However, light signals corresponding to the same channel number within different wavelength bands with a wavelength difference equal to a multiple of the free spectral range (FSR) are directed toward a same output port. In essence, it incorporates characteristics of both an optical interleaver and a demultiplexer. In operation, when the device is used in conjunction with a bandpass filter, it functions as a demultiplexer for each wavelength band.

The device according to the simple implementation of the first embodiment of the invention as illustrated in FIG. 3 has two limitations. First, band pass filters with very sharp transitions are required for separating the different wavelength bands. Second, since the full free spectral range of the grating is used for demultiplexing the channels within a band, the loss non-uniformity, i.e. the loss difference between the central channel and the channels at the band edge can be as large as 3 dB, which is undesirable in many applications. As shown in the example of FIG. 3, the outside channels within the four-channel band do experience more attenuation than the two central channels.

Figure 5:
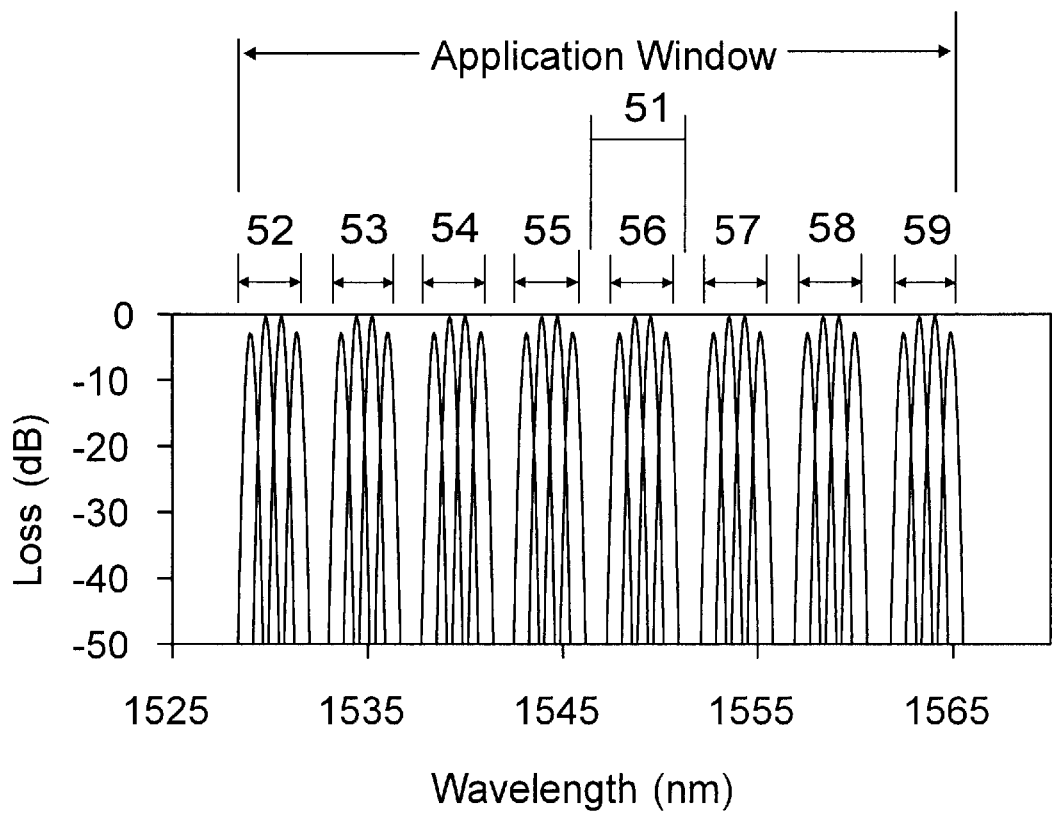
FIG. 5 is overall spectral response curves of an implementation of the invention supporting multiple bands with a gap between adjacent bands to accommodate imperfect spectral passband transition of band add-drop filters.

FIG. 5 shows overall spectral response curves of a device according to a second embodiment of the invention. The free spectral range of the device is larger than the working spectral range of each band so that a gap exists between two adjacent bands to facilitate the band filtering. Each of the wavelength bands is centered around an optimally blazed central wavelength so that the transmission losses for the wavelength channels within the wavelength band are minimal and most uniform. This feature accommodates slow transition slopes in the passband spectra associated with ordinary band add-drop filters. The loss non-uniformity of the multiplexer/demultiplexer device is also somewhat reduced.

Figure 6A:
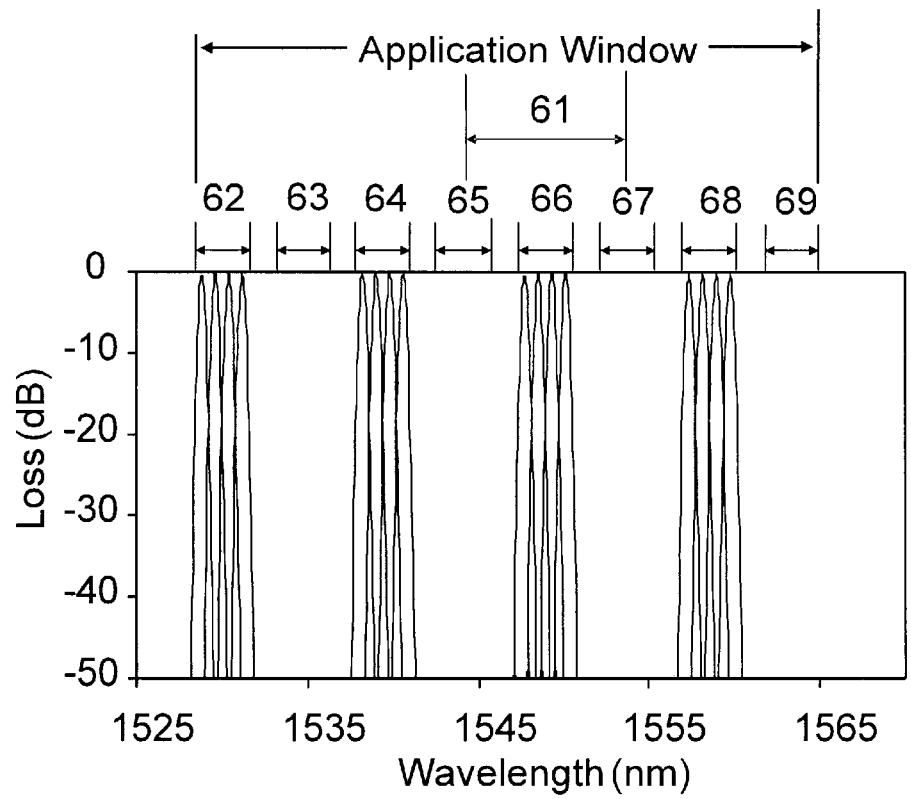
FIGS. 6a and 6b are overall spectral response curves of an implementation of the invention supporting multiple non-adjacent bands. Two devices are used to cover the whole application window, one for the odd band (a) and the other for the even bands (b)
Figure 6B:
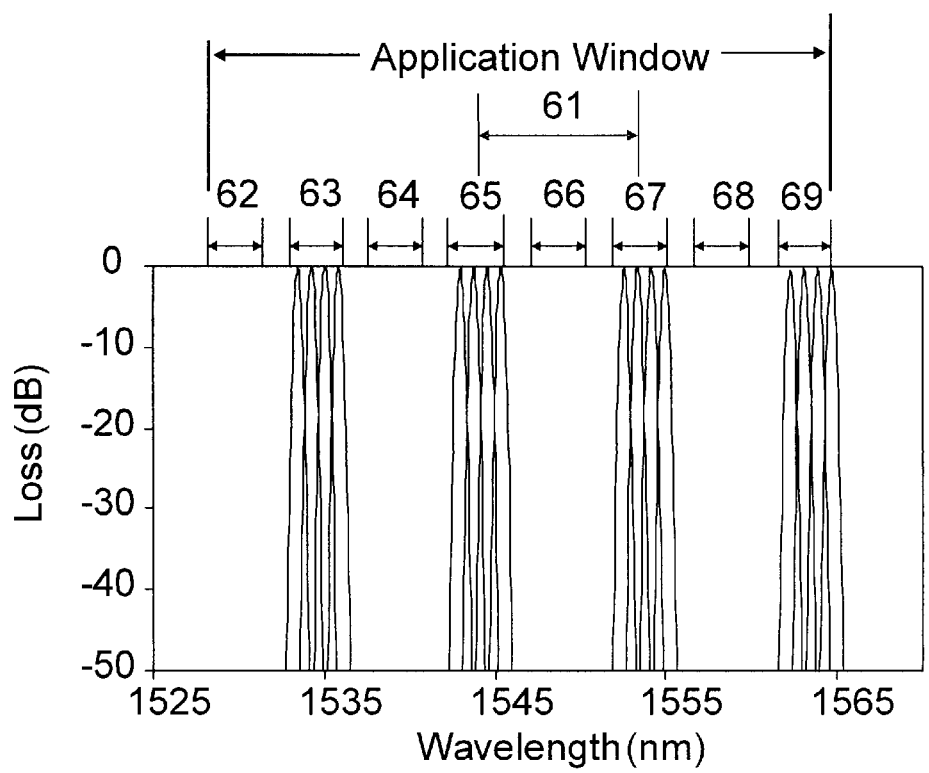

To further reduce the loss non-uniformity, the free spectral range of the device is further increased to contain two bands, with an optional gap between adjacent bands. The optical channels within every other wavelength band within the application window can be processed by the same device. FIG. 6 shows the overall response curves of an implementation according to a third embodiment of the invention. Two devices are used to cover the application window, one for processing the odd bands (FIG. 6a) and the other for processing the even bands (FIG. 6b). Each of the operating wavelength bands is located in the middle of the free spectral range of the grating around an optimally blazed central wavelength so that the transmission losses for the wavelength channels within the wavelength bands are minimal and most uniform. The two devices are designed independently for the odd and even wavelength bands, respectively. Using such a design, the loss-nonuniformity between different channels can be reduced to less than 0.5 dB while the whole application window is covered by only two different devices.

Since the grating device is bi-directional, it can be used as a multiplexer or a demultiplexer. The cyclic behavior of the device according to the present invention can also be implemented in integrated multiplexer and demultiplexer based on a single grating, as is disclosed in U.S. patent application filed on Mar. 6, 2001 entitled Bidirectional Multiplexer and Demultiplexer Based On A Single Echelle Waveguide Grating in the name of the present inventors and incorporated herein by reference.

Figure 7:
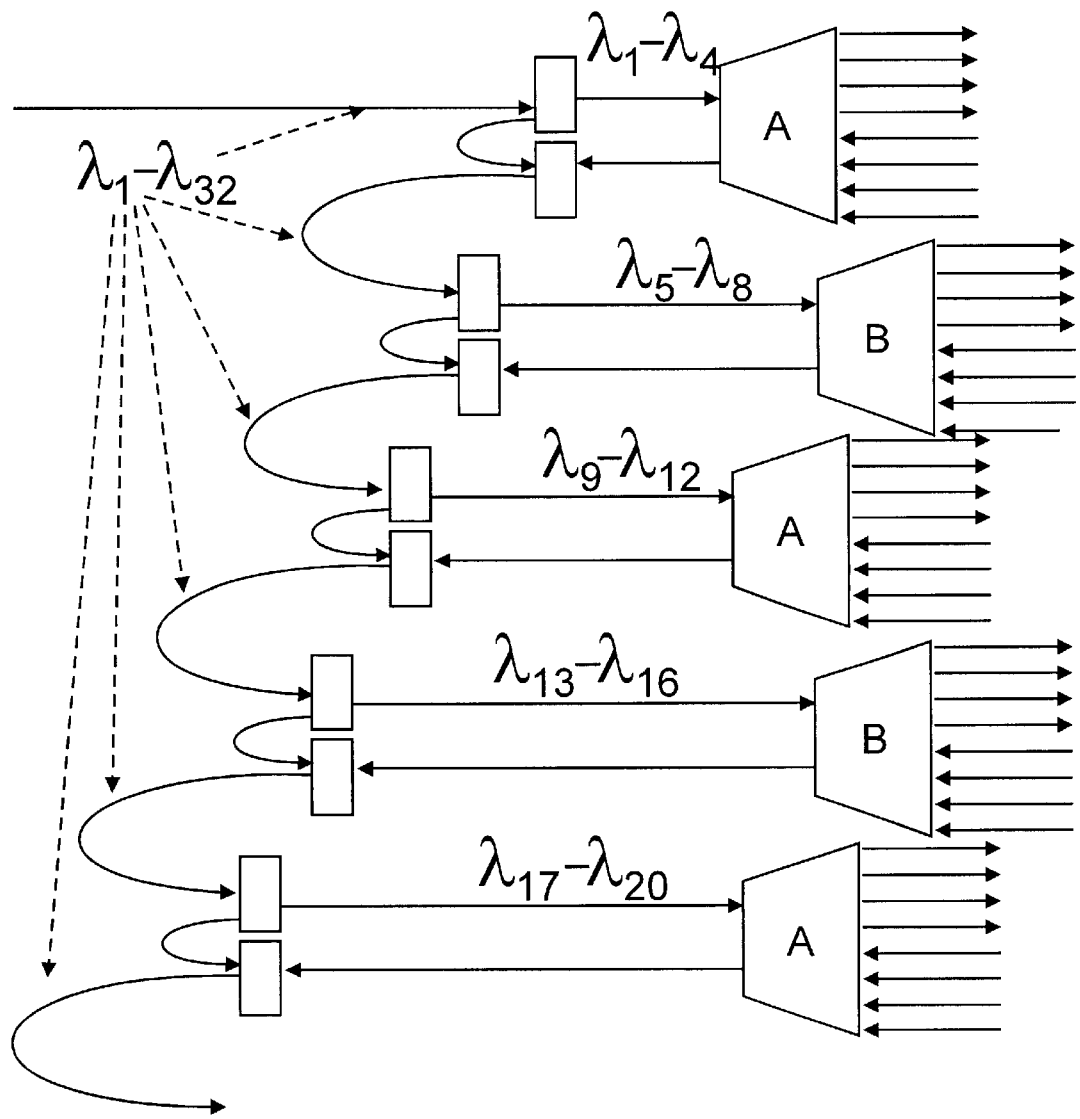
FIG. 7 is an exemplary implementation of an optical network having a plurality of optical band add-drop nodes each consisting of an optical band pass filter and a bi-directional multiplexer/demultiplexer supporting multiple bands according to the present invention.

FIG. 7 is an exemplary implementation of an optical network having a plurality of optical band add-drop nodes each comprising two optical band pass filters and a bidirectional multiplexer/demultiplexer supporting multiple bands according to the present invention. The first optical band pass filter is used for separating optical channels within an add-drop wavelength band from those of other wavelength bands within an application window and for providing the channels within the add-drop wavelength band to the input port of the demultiplexer and those of other wavelength bands to a second optical band pass filter. The second optical band pass filter is used for combining optical channels within the add-drop wavelength band received from the output port of the multiplexer with those of other wavelength bands received from the first optical band pass filter. The add-drop wavelength bands are different for different nodes while the multiplexing and demultiplexing devices are identical for at least a subset of the different nodes. In this example, two different devices A and B whose characteristics are shown in FIG. 6a and 6b respectively according to the third embodiment of the invention are used. The device A is used in the odd nodes for multiplexing and demultiplexing odd wavelength bands, i.e., $\lambda_1 \sim \lambda_4$, $\lambda_9 \sim \lambda_{12}$, . . . etc. The device B is used in the even nodes for multiplexing and demultiplexing even wavelength bands, i.e., $\lambda_5 \sim \lambda_8$, $\lambda_{13} \sim \lambda_{16}$, . . . etc.

It is an advantage of the embodiments of the present invention that the waveguide grating based device is capable of performing multiplexing and demultiplexing functions in multiple wavelength bands. Since the same device is useful for different wavelength bands within a system application window, it reduces the number of devices that an organization needs to stock in its inventory. Similarly when the same parts are used regardless of the wavelength channel of interest it is more difficult to install the incorrect components. Therefore, it simplifies the manufacturing and assembly processes for both system and component suppliers.

Advantageously, when a single device or device pair provides operation over a plurality of different bands and is used in conjunction with reconfigurable band pass filters, dynamic switching of different bands to a same device is possible wherein the device is capable of (de)multiplexing any of a plurality of switched bands. This flexibility for use in dynamic networks is highly advantageous.

Another advantage of the invention is that as further bands become needed to support data communication bandwidth, a simple process of adding further bands in accordance with the free spectral range of the device(s) allows for use of additional bands without a need for further different optical components. Thus, the invention is compatible with expandable systems.

Clearly, most optical devices are bi-directional and, as such, input ports for multiplexers are otherwise labeled output ports for demultiplexers and so forth.

It is apparent to those skilled in the art that modifications and alternative embodiments can be made without departing substantially from the teachings of the invention.

For example, same principles can be applied to multiplexers and demultiplexers based on bulk diffraction gratings.

What is claimed is:

1. An optical network having a predetermined application wavelength window comprising:
   a plurality of optical band add-drop nodes each comprising a demultiplexing device supporting multiple wavelength bands within the application wavelength window including:
      an input port for receiving a multiplexed optical signal including optical signals within each of a plurality of wavelength channels having a predetermined channel spacing within an add-drop wavelength band corresponding to any one of a plurality of nonoverlapping wavelength bands within the application wavelength window;
      at least three output ports; and
      a wavelength dispersive element for separating the multiplexed optical signal received at the input port in dependence upon wavelength to provide a channelised signal to each of the at least three output ports,
   a multiplexing device supporting multiple wavelength bands within the application wavelength window including:
      an output port for receiving a multiplexed optical signal including optical signals within each of a plurality of wavelength channels having a predetermined channel spacing within a same add-drop wavelength band corresponding to any one of a plurality of nonoverlapping wavelength bands within the application wavelength window;
      at least three input ports; and
      a wavelength dispersive element for combining the channelised optical signals received at the input ports in dependence upon wavelength to provide a multiplexed signal to the output port,
   a first optical band pass filter for separating optical channels within said add-drop wavelength band from those of other wavelength bands and for providing optical signals within the optical wavelength channels within the add-drop wavelength band to the input port of the demultiplexing device; and,
   a second optical band pass filter for receiving optical signals within other wavelength bands from the first optical band pass filter and for combining the same with the optical signals within optical wavelength channels within the add-drop wavelength band received from the output port of the multiplexing device,
   wherein the add-drop wavelength bands for a set of different nodes are different and wherein the multiplexing and demultiplexing devices for a same set of different nodes are identical,
   wherein at different nodes a signal within a different wavelength channel is directed toward a same output port of the identical devices.

2. An optical network as recited in claim 1 wherein the add-drop nodes associated with a first set of the non-overlapping wavelength bands use a first identical multiplexer and demultiplexer while the add-drop nodes associated with a second other set of the non-overlapping wavelength bands use a second other identical multiplexer and demultiplexer.

3. An optical network as recited in claim 1 wherein the demultiplexing device and the multiplexing device within a same node are integrated onto a same substrate having different input ports, different output ports, and a same dispersive element.

4. An optical network as recited in claim 1 wherein the optical band pass filters are dynamically reconfigurable.

5. An optical network as recited in claim 1 wherein the dispersive element is an echelle grating.

6. An optical network comprising:
   a first optical component including:
      an input port for receiving including optical signals within each of a plurality of wavelength channels having a predetermined channel spacing within any one of a first set of non-overlapping wavelength bands within an application wavelength window;
      at least three output ports; and
      a wavelength dispersive element for separating the multiplexed optical signal received at the input port in dependence upon wavelength to provide a channelised signal to each of the at least three output ports,
      wherein an optical signal corresponding to a first optical channel within any one of the first set of non-overlapping wavelength bands is directed to a first output port and another optical signal corresponding to a second optical channel within any one of the first set of non-overlapping wavelength bands is directed to a second output port and a third optical signal corresponding to a third optical channel within any one of the first set of non-overlapping wavelength bands is directed to a third output port;
   a second optical component including:
      an input port for receiving a multiplexed optical signal including optical signals within each of a plurality of wavelength channels having a predetermined channel spacing within any one of a second set of non-overlapping wavelength bands within an application wavelength window;
      at least three output ports; and
      a wavelength dispersive element for separating the multiplexed optical signal received at the input port in dependence upon wavelength to provide a channelised signal to each of the at least three output ports, wherein an optical signal corresponding to a first optical channel within any one of the second set of non-overlapping wavelength bands is directed to a first output port and another optical signal corresponding to a second optical channel within any one of the second set of non-overlapping wavelength bands is directed to a second output port and a third optical signal corresponding to a third optical channel within any one of the second set of non-overlapping wavelength bands is directed to a third output port; and, at least a filter for separating the optical signal into optical signals within each of some of the non-overlapping wavelength bands, and wherein the first and second optical component have a free spectral range that is identical.

7. An optical network according to claim 6 wherein the first optical component receives optical signals within a plurality of wavelength channels within a first wavelength band that are approximately aligned with a portion of the free spectral range of the first wavelength dispersive element having a greatest frequency response.

8. An optical network according to claim 7 wherein the second optical component receives optical signals within a plurality of wavelength channels within a second wavelength band that are approximately aligned with a portion of the free spectral range of the second wavelength dispersive element having a greatest frequency response.

9. An optical device according to claim 8 wherein the wavelength dispersive elements comprise a grating and wherein the greatest frequency response of each wavelength dispersive element is a transmissive portion centered about an optimally blazed central wavelength within a free spectral range of the grating.

10. A method of demultiplexing channelised optical signals comprising the steps of:

providing an optical signal including signals in several of a plurality of non-overlapping wavelength bands within an application wavelength window;

filtering the optical signal to separate a second optical signal including optical signals within a first single non-overlapping wavelength band and separate a third optical signal including optical signals within a second non-overlapping wavelength band;

providing the second optical signal to a first optical demultiplexer;

demultiplexing the second optical signal into a plurality of channelised signals within the first non-overlapping wavelength band;

providing the third optical signal to a second optical demultiplexer identical to the first optical demultiplexer; and demultiplexing the third optical signal into a plurality of channelised signals within the second non-overlapping wavelength band.

* * * * *